United States Patent
Pitigoi-Aron et al.

(10) Patent No.: US 11,023,408 B2
(45) Date of Patent: Jun. 1, 2021

(54) I3C SINGLE DATA RATE WRITE FLOW CONTROL

(71) Applicant: QUALCOMM Incorporated, San Diego, CA (US)

(72) Inventors: Radu Pitigoi-Aron, San Jose, CA (US); Chandan Pramod Attarde, Bangalore (IN); Richard Dominic Wietfeldt, San Diego, CA (US); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 16/405,637

(22) Filed: May 7, 2019

(65) Prior Publication Data

US 2019/0377702 A1 Dec. 12, 2019

Related U.S. Application Data

(60) Provisional application No. 62/682,051, filed on Jun. 7, 2018.

(51) Int. Cl.
*G06F 13/42* (2006.01)

(52) U.S. Cl.
CPC .. *G06F 13/4291* (2013.01); *G06F 2213/0016* (2013.01); *G06F 2213/0038* (2013.01); *G06F 2213/0056* (2013.01)

(58) Field of Classification Search
CPC ......... G06F 13/4291; G06F 2213/0038; G06F 2213/0056; G06F 2213/0016
See application file for complete search history.

(56) References Cited

U.S. PATENT DOCUMENTS

| | | | | |
|---|---|---|---|---|
| 5,221,865 A | * | 6/1993 | Phillips | H03K 17/693 326/16 |
| 5,958,024 A | * | 9/1999 | Typaldos | G06F 13/385 710/26 |
| 6,597,197 B1 | * | 7/2003 | Mosley | G06F 13/4045 326/63 |
| 7,020,076 B1 | * | 3/2006 | Alkalai | H04L 1/22 370/217 |
| 7,912,086 B2 | * | 3/2011 | Moretti | H04L 29/06 370/467 |
| 2004/0059965 A1 | * | 3/2004 | Marshall | G06F 13/4291 714/48 |
| 2010/0153601 A1 | * | 6/2010 | Lin | G06F 13/376 710/110 |
| 2017/0097912 A1 | * | 4/2017 | Takahashi | G06F 13/4282 |
| 2019/0087377 A1 | * | 3/2019 | Srivastava | G06F 13/4063 |

* cited by examiner

*Primary Examiner* — Farley Abad
(74) *Attorney, Agent, or Firm* — Loza & Loza LLP

(57) ABSTRACT

Systems, methods, and apparatus for communication over a serial bus in accordance with an I3C protocol are described that enable a slave device to request that a bus master device terminate a write transaction with the slave device. The serial bus may be operated according to an I3C single data rate protocol. In various aspects of the disclosure, a method performed at a master device coupled to a serial bus includes initiating a write transaction between the master device and a slave device, where the write transaction includes a plurality of data frames, and at least one data frame is configured with a transition bit in place of a parity bit. The method may include terminating the write transaction when the slave device drives a data line of the serial bus while receiving the transition bit.

29 Claims, 16 Drawing Sheets

I3C SINGLE DATA RATE WRITE FLOW CONTROL

PRIORITY CLAIM

This application claims priority to and the benefit of U.S. Provisional Patent Application Ser. No. 62/682,051 filed in the U.S. Patent Office on Jun. 7, 2018, the entire content of this application being incorporated herein by reference as if fully set forth below in its entirety and for all applicable purposes.

TECHNICAL FIELD

The present disclosure relates generally to an interface between processors and peripheral devices and, more particularly, to improving control of a serial bus adapted to permit communication between devices.

BACKGROUND

Certain devices, such as mobile communication devices, include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the I²C bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, the protocols used on an Improved Inter-Integrated Circuit (I3C) serial bus defined by the Mobile Industry Processor Interface (MIPI) Alliance derive certain implementation aspects from the I2C protocol. Original implementations of I2C protocols supported data signaling rates of up to 100 kilobits per second (100 kbps) in standard-mode operation, with more recent standards supporting speeds of 400 kbps in fast-mode operation, and 1 megabit per second (Mbps) in fast-mode plus operation. Certain aspects of the I3C protocol are derived from corresponding aspects of the I2C protocol, and the I2C and I3C protocols can coexist on the same serial bus.

There is a continuous demand for increased performance of serial buses, and there exists an ongoing need for providing improved signaling and optimization of protocols used in I3C protocols and the like.

SUMMARY

Certain aspects of the disclosure relate to systems, apparatus, methods and techniques that optimize throughput on a serial bus that may be operated in multiple modes of communication. In one example, techniques are disclosed in which a slave device may assert a flow control in-band signal that causes a master device on an I3C bus to transmit a STOP condition, and/or repeated START condition to terminate a write transaction with the slave device coupled to the I3C bus. The serial bus may be operated in accordance with an I3C single data rate protocol.

In various aspects of the disclosure, a method performed at a master device coupled to a serial bus includes initiating a write transaction between the master device and a slave device, where the write transaction includes a plurality of data frames, and at least one data frame is configured with a transition bit in place of a parity bit. The method may include terminating the write transaction when the slave device drives a data line of the serial bus while receiving the transition bit.

In some aspects, terminating the write transaction includes transmitting signaling corresponding to a repeated START condition defined by a protocol used to control communications over the serial bus. Terminating the write transaction may include transmitting signaling corresponding to a STOP condition defined by the protocol used to control communications over the serial bus after transmitting the repeated START condition. Terminating the write transaction may include transmitting signaling corresponding to a STOP condition defined by a protocol used to control communications over the serial bus.

In certain aspects, the transition bit may be provided in the at least one data frame by driving the data line of the serial bus to a high state after data bits of the at least one data frame have been transmitted, and causing a line driver coupled to the data line to enter a high impedance mode after driving the data line of the serial bus to the high state. The data line is maintained at the high state by a pull-up structure. The high impedance mode may be an open-drain mode. The write transaction may be terminated after a low state on the data line in a bit interval reserved for the transition bit.

In various aspects of the disclosure, an apparatus adapted to operate as a master device when coupled to a serial bus may have a bus interface circuit operated in accordance with an I3C single data rate protocol and configured to couple the master device to the serial bus and a processing device. The processing device may be configured to initiate a write transaction between the master device and a slave device, where the write transaction includes a plurality of data frames, and at least one data frame is configured with a transition bit in place of a parity bit. The processing device may be configured to terminate the write transaction when the slave device drives a data line of the serial bus while receiving the transition bit.

In one aspect, the processing device is configured to provide the transition bit in the at least one data frame by driving the data line of the serial bus to a high state after data bits of the at least one data frame have been transmitted, and cause a line driver coupled to the data line to enter a high impedance mode after driving the data line of the serial bus to the high state.

In various aspects of the disclosure, a method performed at a serial device coupled to a serial bus includes receiving a configuration command from a master device indicating that data frames transmitted during a write transaction include transition bits in place of parity bits, receiving a data frame from the serial bus during a write transaction, and driving a data line of the serial bus while receiving a transition bit of the data frame to assert a flow control request.

In certain aspects, signaling corresponding to a repeated START condition may be received after asserting the flow control request, the repeated START condition being defined by a protocol used to control communications over the serial bus. Signaling corresponding to a STOP condition may be received. In one example the STOP condition may be received after a repeated START condition is received.

In some aspects, the transition bit is provided on the data line after eight data bits of the data frame have been received. The data line may be maintained in a high state by a pull-up structure prior to assertion of flow control. The data line may be driven low to assert flow control.

In various aspects of the disclosure, an apparatus adapted to operate as a slave device when coupled to a serial bus has a bus interface circuit operated in accordance with an I3C single data rate protocol and configured to couple the slave device to the serial bus, and a processing device. The processing device may be configured to receive a configuration command from a master device indicating that data frames transmitted during a write transaction include transition bits in place of parity bits, receive a data frame from the serial bus during a write transaction, and cause the bus interface to assert a flow control request by driving a data line of the serial bus while a transition bit of the data frame is being received.

In certain aspects, signaling corresponding to a repeated START condition may be received after asserting the flow control request, the repeated START condition being defined by a protocol used to control communications over the serial bus. Signaling corresponding to a STOP condition may be received. In one example the STOP condition may be received after a repeated START condition is received.

In some aspects, the transition bit is provided on the data line after eight data bits of the data frame have been received. The data line may be maintained in a high state by a pull-up structure prior to assertion of flow control. The data line may be driven low to assert flow control.

DETAILED DESCRIPTION

Figure 1:
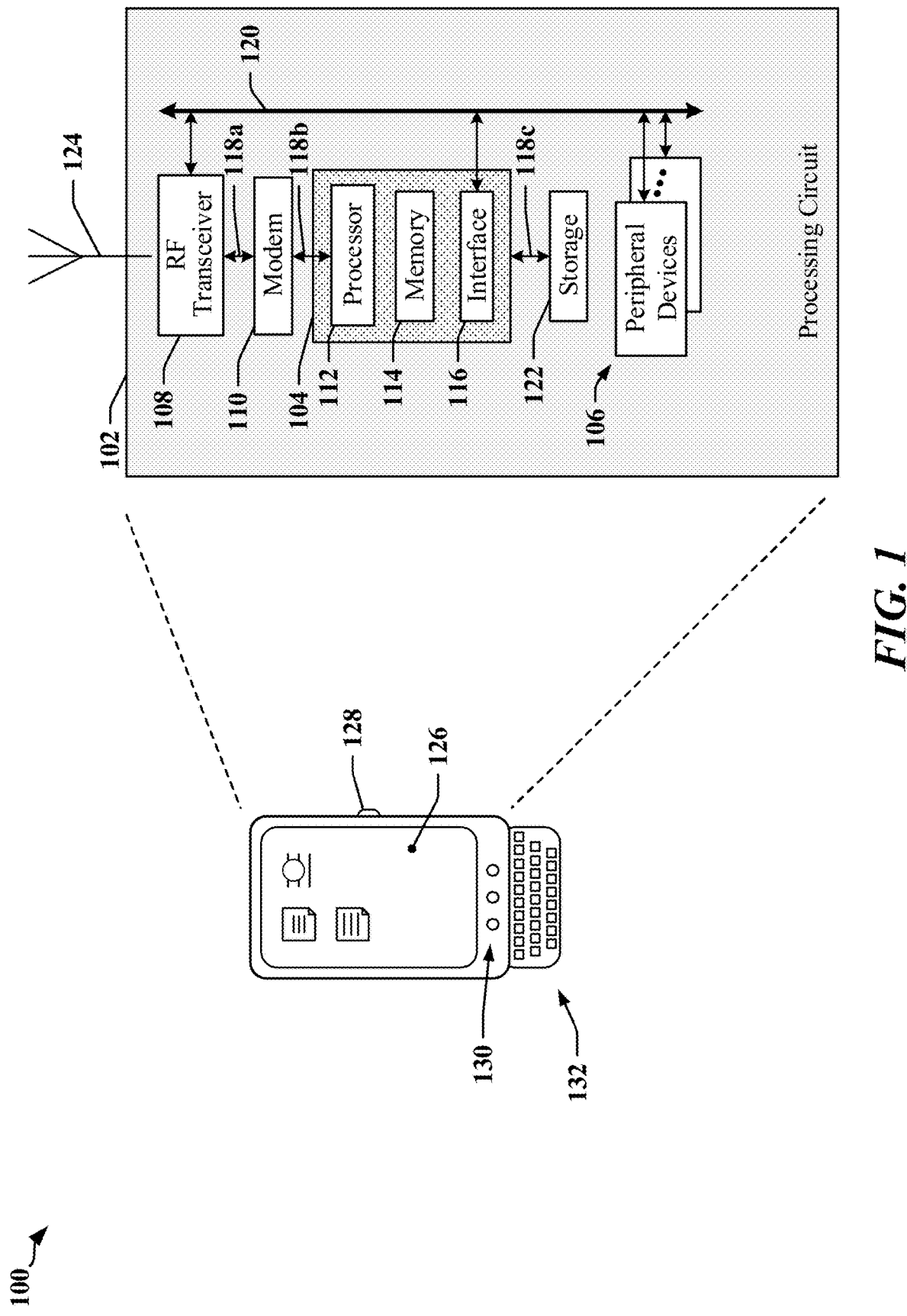
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoCs and/or other IC devices often employ a serial bus to connect processors with modems and other peripherals. The serial bus may be operated in accordance with specifications and protocols defined by a standards body. In one example, the serial bus may be operated in accordance with I3C protocols, which define timing relationships between signals and transmissions that enable devices limited to communicating in accordance with I2C protocols to coexist on a serial bus with devices that communicate in accordance with I3C protocols. I3C protocols that may be used to control communication over a serial bus include an I3C single data rate (SDR) protocol. In conventional implementations, the I3C SDR protocol provides no flow control mechanism by which a slave device can request a master device to pause or stop transmissions during a slave write transaction. Implementation of flow control may prevent issues arising when the receiving slave device has insufficient memory, register space, processing capability or other resources to handle incoming data. Implementation of flow control may enable a slave device to cause a pause in a transaction in order to signal a mission critical event, such as events related to temperature, bio-hazards, etc.

According to various aspects of the disclosure, a slave device that is the target of a device write by a master device can use in-band signaling to cause the master device to refrain from transmitting data. The master device may pause and/or terminate the transaction. In one example, the function of the ninth bit in a transmitted frame may be changed. The ninth bit in an I3C SDR write frame may conventionally serve as a parity bit, and the master and slave devices in a slave write transaction may be adapted to treat the ninth bit in the I3C SDR write frame as a T-bit that can support in-band signaling.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106, 108 and/or 110, which may be implemented in one or more ASICs and/or one or more SoCs. In one example, the apparatus 100 may be a communication device and the processing circuit 102 may include ASIC 104 that includes a processor 112. The ASIC 104 may implement or function as a host or application processor. The apparatus 100 may include one or more peripheral devices 106, one or more modems 110 and a transceiver 108 that enables the apparatus to communicate through an antenna 124 with a radio access network, a core access network, the Internet and/or another network. The configuration and location of the circuits or devices 104, 106, 108, 110 may vary between applications.

The circuits or devices 104, 106, 108, 110 may include a combination of sub-components. In one example, the ASIC 104 may include more than one processors 112, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 118c, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
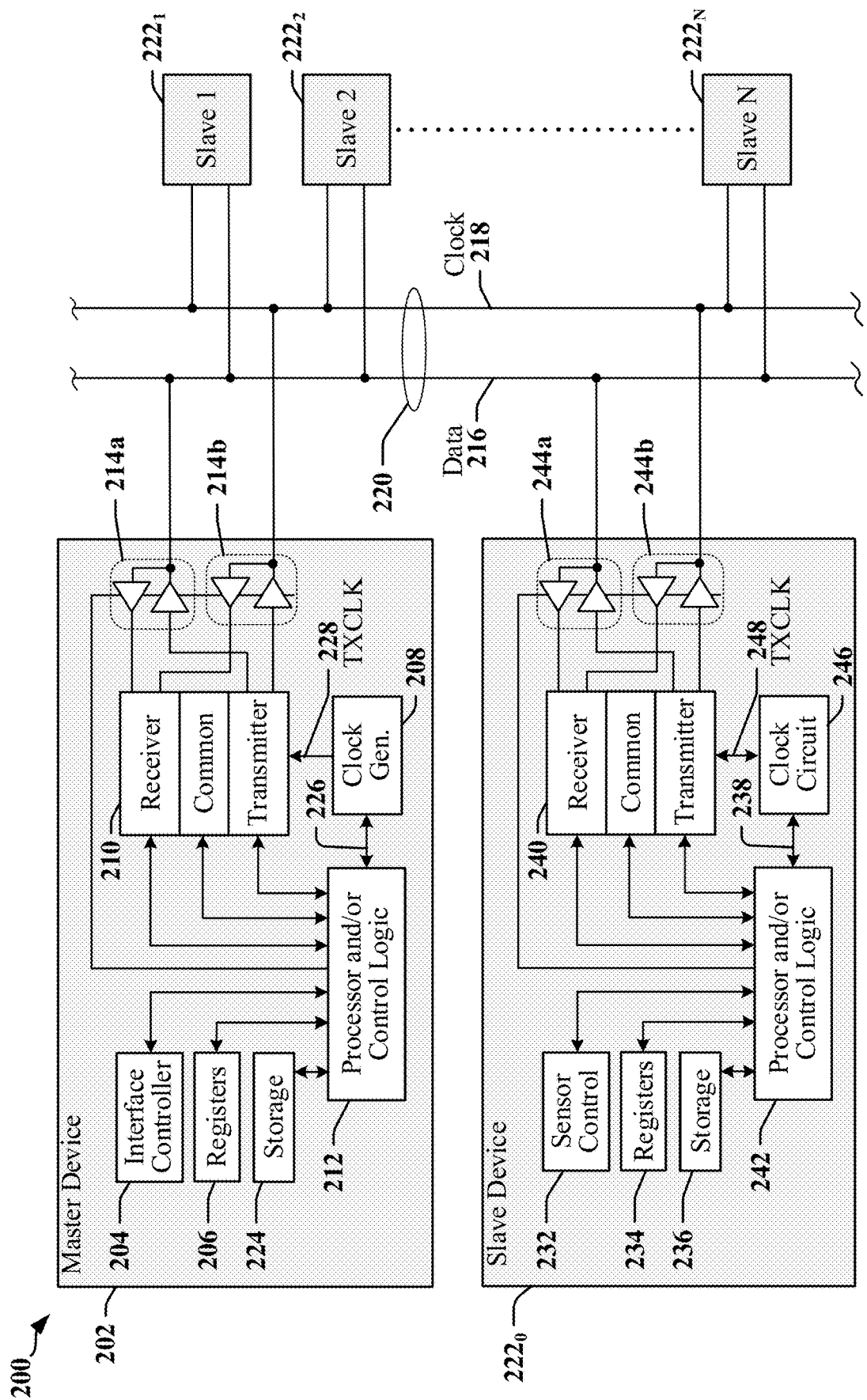
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a master device 202. Certain types of bus can support multiple master devices 202.

In one example, a master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222o$ configured to operate as a slave device may provide a control function, module or circuit 232 that includes circuits and modules to support a display, an image sensor, and/or circuits and modules that control and communicate with one or more sensors that measure environmental conditions. The slave device $222o$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
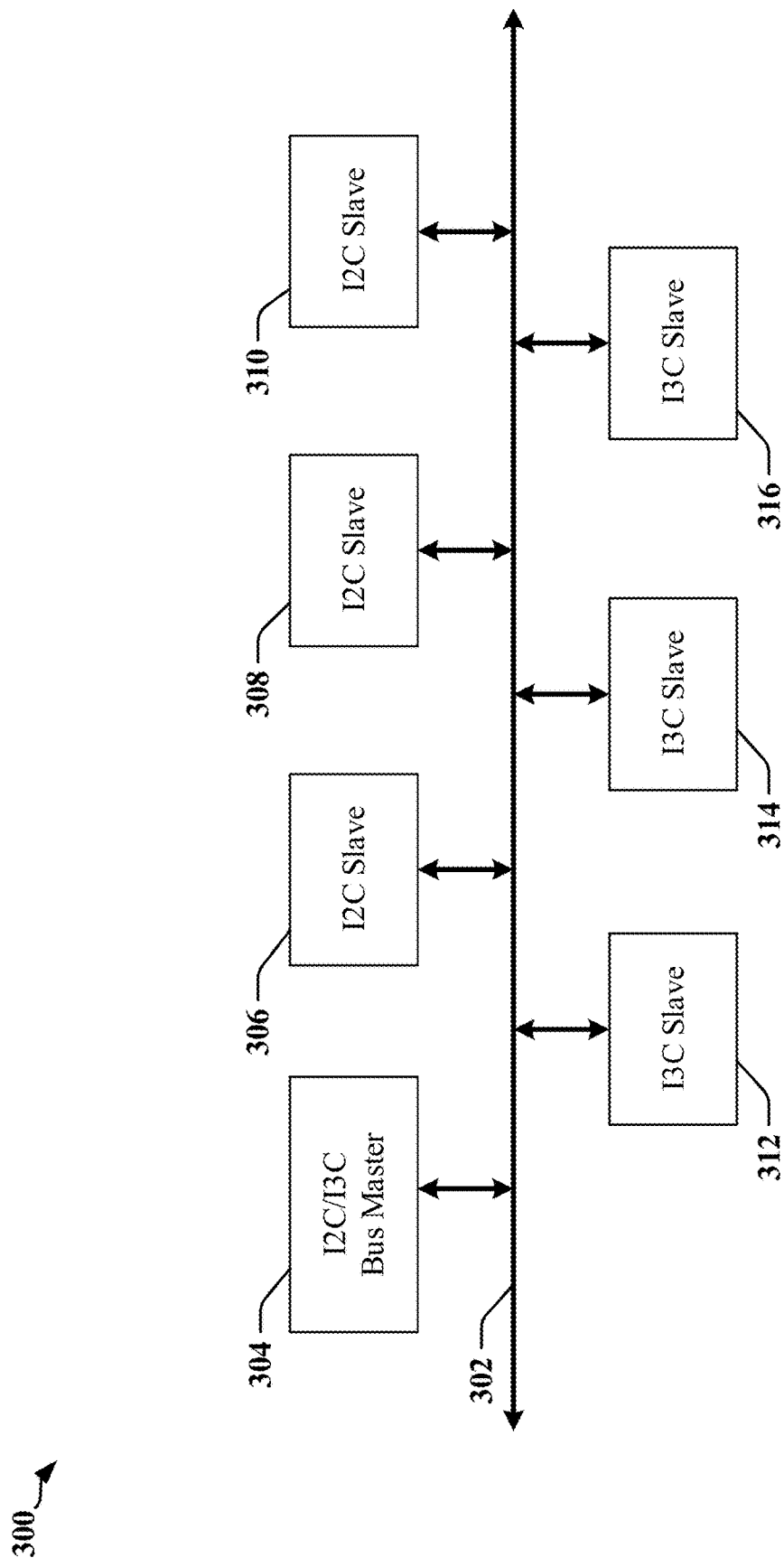
FIG. 3 illustrates a configuration of devices coupled to a common serial bus.

FIG. 3 illustrates a system 300 having multiple devices 304, 306, 308, 310, 312, 314 and 316 connected to a serial bus 302, whereby I3C devices 304, 312, 314 and 316 may be adapted or configured to obtain higher data transfer rates over the serial bus 302 using I3C protocols. The I3C devices 304, 312, 314 and 316 may coexist with conventionally configured I2C devices 306, 308, and 310. The I3C devices 304, 312, 314 and 316 may alternatively or additionally communicate using conventional I2C protocols, as desired or needed.

The serial bus 302 may be operated at higher data transfer rates when a master device 304 operates as an I3C bus master when controlling the serial bus 302. In the depicted example, a single master device 304 may serve as a bus master in an I2C mode and in an I3C mode that supports a data transfer rate that exceeds the data transfer rate achieved when the serial bus 302 is operated according to a conventional I2C protocol. The signaling used for higher data-rate traffic may take advantage of certain features of I2C protocols such that the higher data-rate traffic can be carried over the serial bus 302 without compromising the functionality of legacy I2C devices 306, 308 and 310 coupled to the serial bus 302.

Timing in an I2C Bus

Figure 4:
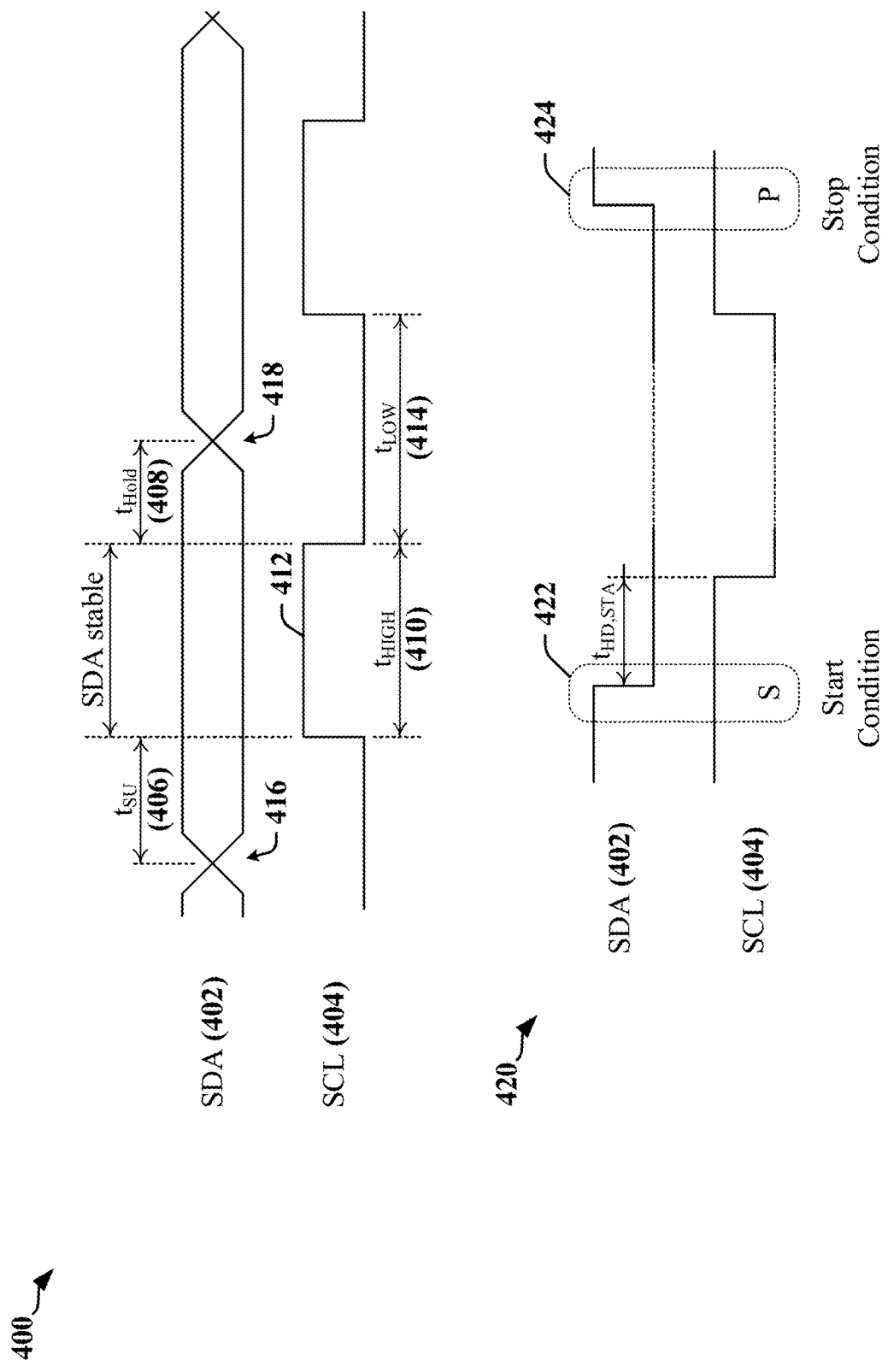
FIG. 4 illustrates certain aspects of the timing relationship between SDA and SCL wires on a conventional I2C bus.

FIG. 4 includes timing diagrams 400 and 420 that illustrate the relationship between SDA 402 and SCL 404 on a conventional I2C bus. The first timing diagram 400 illustrates the timing relationship between SDA 402 and SCL 404 while data is being transferred on the conventionally configured I2C bus. SCL 404 provides a series of pulses that can be used to sample data in SDA 402. The pulses (including the pulse 412, for example) may be defined as the time during which SCL 404 is determined to be in a high logic state at a receiver. When SCL 404 is in the high logic state during data transmission, data on SDA 402 is required to be stable and valid; the state of SDA 402 is not permitted to change when SCL 404 is in the high logic state.

Specifications for conventional I2C protocol implementations (which may be referred to as "I2C Specifications") define a minimum duration 410 ($t_{HIGH}$) of the high period of the pulse 412 on SCL 404. The I2C Specifications also define minimum durations for a setup time 406 ($t_{SU}$) before occurrence of the pulse 412, and a hold time 408 ($t_{HOLD}$) after the pulse 412 terminates. The signaling state of SDA 402 is expected to be stable during the setup time 406 and the hold time 408. The setup time 406 defines a maximum time period after a transition 416 between signaling states on SDA 402 until the arrival of the rising edge of the pulse 412 on SCL 404. The hold time 408 defines a minimum time period after the falling edge of the pulse 412 on SCL 404 until a next transition 418 between signaling states on SDA 402. The I2C Specifications also define a minimum duration 414 for a low period ($t_{LOW}$) for SCL 404. The data on SDA 402 is typically stable and/or can be captured for the duration 410 ($t_{HIGH}$) when SCL 404 is in the high logic state after the leading edge of the pulse 412.

The second timing diagram 420 of FIG. 4 illustrates signaling states on SDA 402 and SCL 404 between data transmissions on a conventional I2C bus. The I2C protocol provides for transmission of 8-bit data (bytes) and 7-bit addresses. A receiver may acknowledge transmissions by driving SDA 402 to the low logic state for one clock period. The low signaling state represents an acknowledgement (ACK) indicating successful reception and a high signaling state represents a negative acknowledgement (NACK) indicating a failure to receive or an error in reception.

A START condition 422 is defined to permit the current bus master to signal that data is to be transmitted. The START condition 422 occurs when SDA 402 transitions from high to low while SCL 404 is high. The I2C bus master initially transmits the START condition 422, which may also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of SDA 402 as a NACK. The master and slave devices may then exchange bytes of information in frames, in which the bytes are serialized such that the most significant bit (MSB) is transmitted first. The transmission of the byte is completed when a STOP condition 424 is transmitted by the I2C master device. The STOP condition 424 occurs when SDA 402 transitions from low to high while SCL 404 is high. The I2C Specifications require that all transitions of SDA 402 occur when SCL 404 is low, and exceptions may be treated as a START condition 422 or a STOP condition 424.

Figure 5:
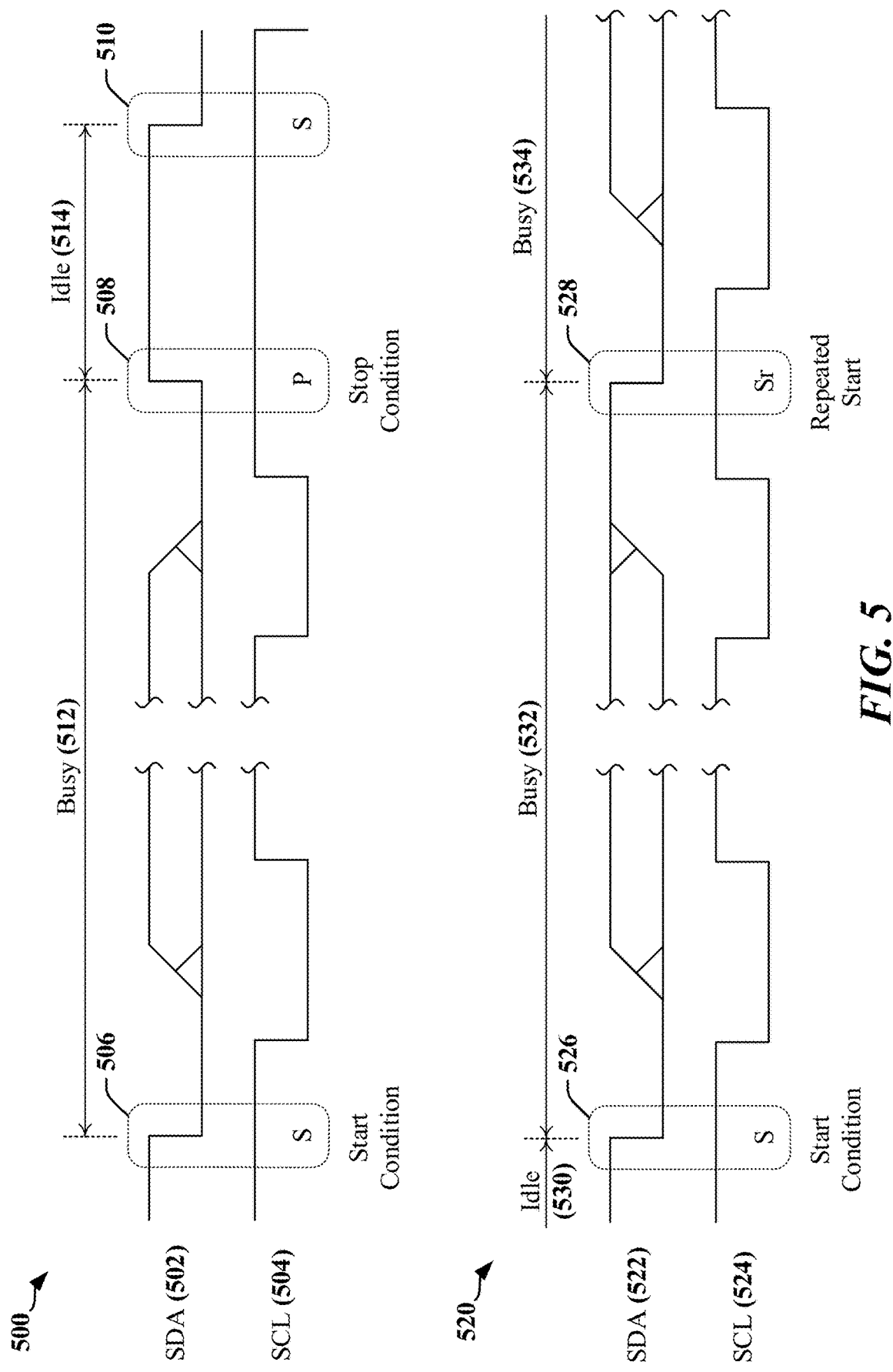
FIG. 5 is a timing diagram that illustrates timing associated with multiple frames transmitted on an I2C bus.

FIG. 5 includes diagrams 500 and 520 that illustrate timing associated with data transmissions on a serial bus that has a data line (SDA 502) and a clock line (SCL 504). As illustrated in the first diagram 500, an idle period 514 may occur between a STOP condition 508 and a consecutive START condition 510. This idle period 514 may be prolonged and may result in reduced data throughput when a conventional serial bus remains idle between the STOP condition 508 and the consecutive START condition 510. In operation, a busy period 512 commences when the I2C bus master transmits a first START condition 506, followed by data. The busy period 512 ends when the bus master transmits a STOP condition 508 and the idle period 514 ensues. The idle period 514 ends when a second START condition 510 is transmitted.

The second timing diagram 520 illustrates a method by which the number of occurrences of an idle period 514 may be reduced. In the illustrated example, data is available for transmission before a first busy period 532 ends. The bus master device may transmit a repeated START condition 528 (Sr) rather than a STOP condition. The repeated START condition 528 terminates the preceding data transmission and simultaneously indicates the commencement of a next data transmission. The state transition on SDA 522 corresponding to the repeated START condition 528 is identical to the state transition on SDA 522 for a START condition 526 that occurs after an idle period 530. For both the START condition 526 and the repeated START condition 528, SDA 522 transitions from high to low while SCL 524 is high. When a repeated START condition 528 is used between data transmissions, a first busy period 532 is immediately followed by a second busy period 534.

Figure 6:
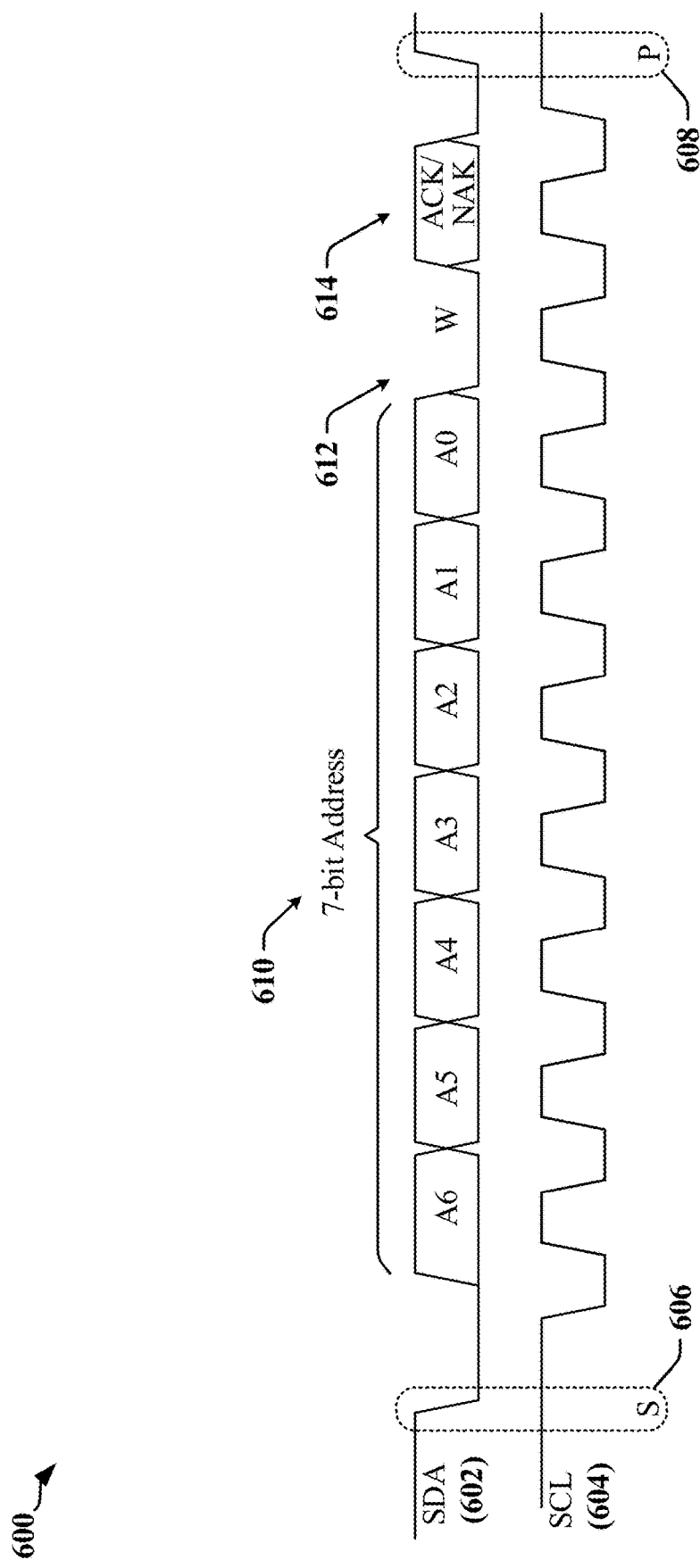
FIG. 6 illustrates timing related to a data word sent to a slave device in accordance with I3C protocols.

FIG. 6 is a diagram 600 that illustrates an example of the timing associated with a command word sent to a slave device in accordance with I2C protocols. In the example, a master device initiates the transaction with a START condition 606, whereby SDA 602 is driven from high to low while SCL remains high. The master device then transmits a clock signal on SCL 604. The seven-bit address 610 of a slave device is then transmitted on SDA 602. The seven-bit address 610 is followed by a Write/Read command bit 612, which indicates "Write" when low and "Read" when high. The slave device may respond in the next clock interval 614 with an acknowledgment (ACK) by driving SDA 602 low. If the slave device does not respond, SDA 602 is pulled high and the master device treats the lack of response as a NACK. The master device may terminate the transaction with a STOP condition 608 by driving SDA 602 from low to high while SCL 604 is high. This transaction can be used to determine whether a slave device with the transmitted address coupled to the I2C bus is in an active state.

The master device relinquishes control of SDA 602 after transmitting the Write/Read command bit 612 such that the slave device may transmit an acknowledgment (ACK) bit on SDA 602. In some implementations, open-drain drivers are used to drive SDA 602. When open-drain drivers are used, the SDA drivers in the master device and the slave device may be active concurrently. In other implementations, push-pull drivers are used to drive SDA 602. When push-pull drivers are used, the signaling state of SDA 602 may be indeterminate when the SDA drivers in both the master device and the slave device are active concurrently.

Timing for an I3C Bus

Figure 7:
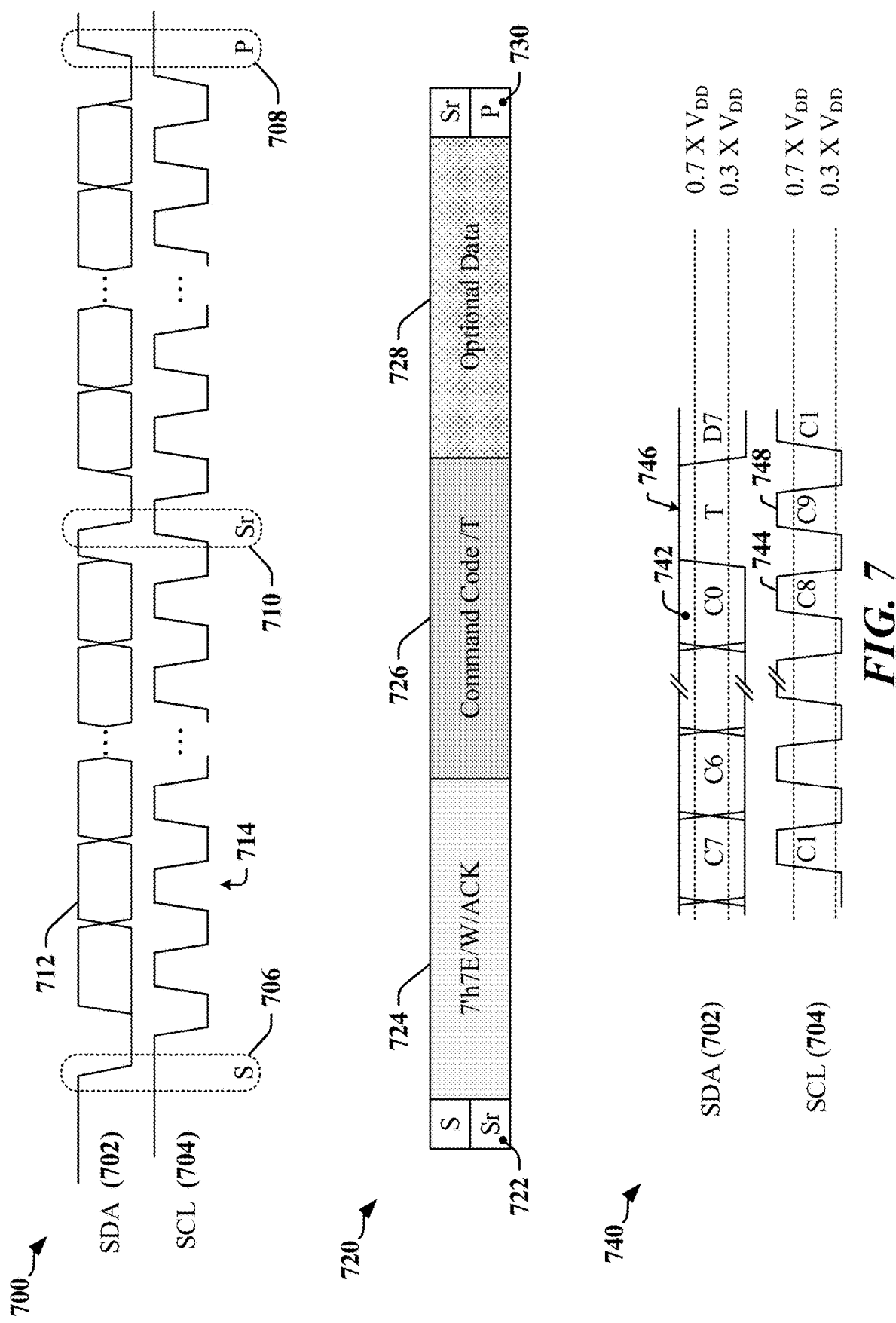
FIG. 7 illustrates an example of the timing associated with a data read from a slave device in accordance with I3C protocols.

FIG. 7 is a diagram 700 that illustrates an example of the timing associated with data read from a slave device in accordance with a single data rate (SDR) I3C protocol. Data transmitted on a first wire (SDA 702) of the serial bus may be captured using a clock signal transmitted on a second wire (SCL 704) of the serial bus. SDA 702 can be bidirectional where, data can be transmitted from a master device to a slave device in a first transaction, or from a slave device to a master device in a second transaction. In one example, a master device drives the clock signal on SCL 704 and transmits data on SDA 702 during slave write transactions. Certain I3C devices may include drivers that drive SDA 702 in open-drain and push-pull modes. In open-drain mode, the drivers can tolerate concurrent driving of SDA 702 by slave and master devices. In certain modes of operation, the I3C device drivers are operated in push-pull mode and the master device and the slave device generally cannot drive SDA 702 concurrently.

Data transmitted on SDA 702 may be captured using the clock signal transmitted on SCL 704. During data transmission, the signaling state 712 of SDA 702 is expected to remain constant for the duration of the pulses 714 when SCL 704 is at a high voltage level. Transitions on SDA 702 when SCL 704 is at the high voltage level indicate a START condition 706, a STOP condition 708 or a repeated START 710.

On an I3C serial bus, a START condition 706 is defined to permit the current bus master to signal that data is to be transmitted. The START condition 706 occurs when SDA 702 transitions from high to low while SCL 704 is high. The bus master may signal completion and/or termination of a transmission using a STOP condition 708. The STOP condition 708 is indicated when SDA 702 transitions from low to high while SCL 704 is high. A repeated START 710 may be transmitted by a bus master that wishes to initiate a second transmission upon completion of a first transmission. The repeated START 710 is transmitted instead of, and has the significance of a STOP condition 708 followed immediately by a START condition 706. The repeated START 710 occurs when SDA 702 transitions from high to low while SCL 704 is high.

The bus master may transmit an initiator 722 that may be a START condition 706 or a repeated START 710 prior to transmitting an address of a slave, a command, and/or data. FIG. 7 illustrates a command code transmission 720 by the bus master. The initiator 722 may be followed in transmission by a predefined command 724 indicating that a command code 726 is to follow. The command code 726 may, for example, cause the serial bus to transition to a desired mode of operation. In some instances, data 728 may be transmitted. The command code transmission 720 may be followed by a terminator 730 that may be a STOP condition 708 or a repeated START 710.

The timing diagram 740 illustrates the transmission of a transition bit (T-bit) 746 in the command code transmission 720. During the command code transmission 720, a master device provides a clock signal on SCL 704 and transmits eight bits of command code in a nine-bit frame, each bit of the frame being coincident with a corresponding pulse in the clock signal. For example, the last bit of the command code (here C0 742) is transmitted while the eighth pulse (C8 744) of the frame is present on SCL 704. The T-bit 746 is transmitted concurrently with the ninth pulse (C9 748).

Figure 8:
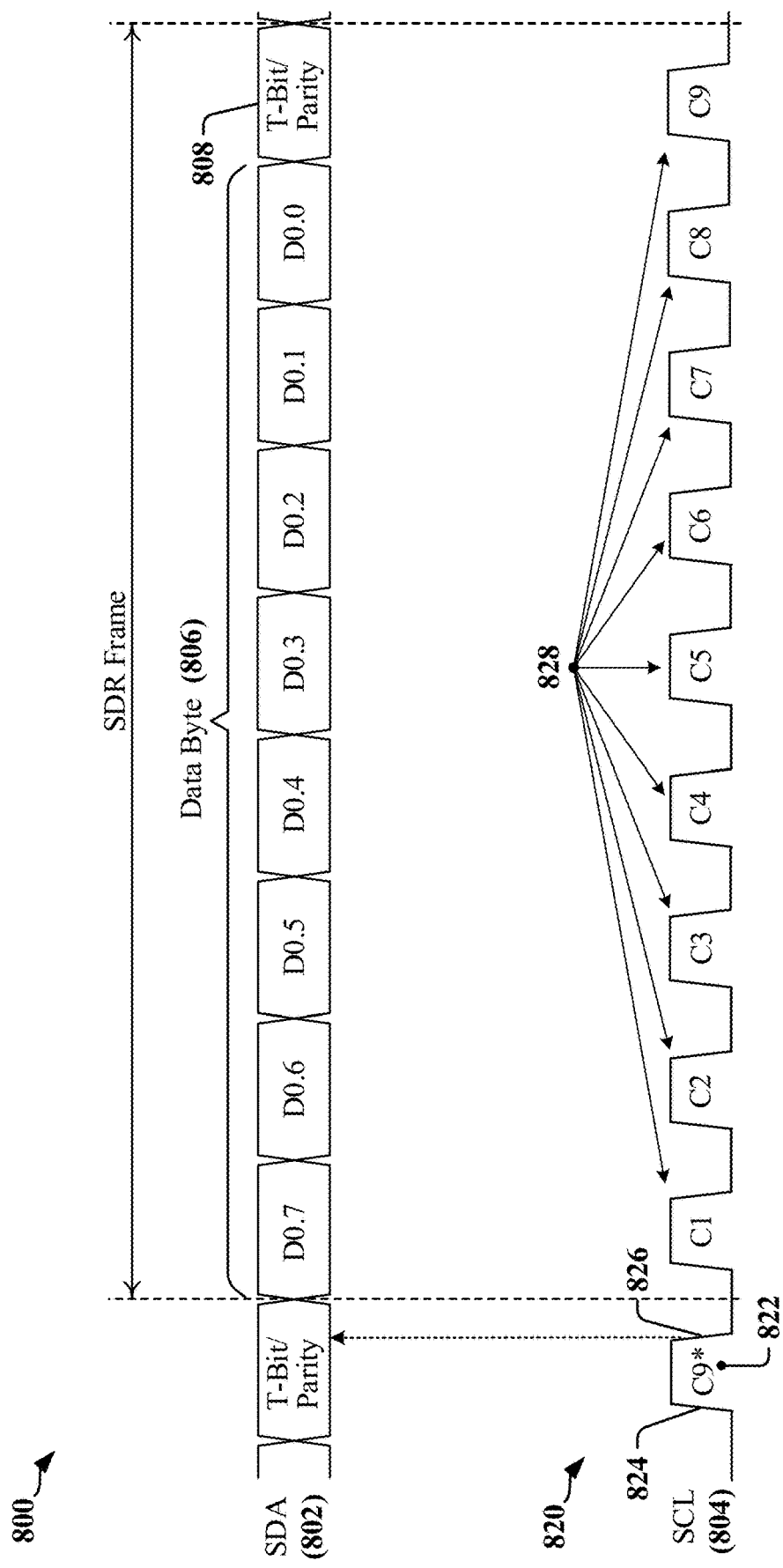
FIG. 8 is a timing diagram that illustrates an example of a transmission of a frame in an I3C single data rate mode.

FIG. 8 includes timing diagrams that illustrate an I3C SDR frame 800 that may be transmitted on a serial bus when a bus master device is communicating with a slave device. A clock signal 820 is transmitted on a clock wire (SCL 804) of the serial bus while data is transmitted on a data wire SDA 802. The clock signal 820 transmitted on SCL 804 provides timing may be usable when the serial bus is operated in an I3C SDR mode and in an I3C high data rate (HDR) double data rate (DDR) mode. The clock signal 820 includes pulses 822, 828 that are defined by a rising edge 824 and a falling edge 826. A bus master device transmits the clock signal 820 on SCL 804 regardless of the direction of flow of data over the serial bus.

The I3C SDR frame 800 carries a single byte of data 806 and a bit slot 808 that carries a parity bit during slave write transactions and a T-bit during slave read transactions.

According to certain aspects of the disclosure herein, a slave device may assert flow control during a device write transaction. Flow control enables the slave device to request that the master device pause and/or cease writing data to the slave device. The slave device may assert flow control due to limited memory capacity, and/or when an unexpected or critical event is detected. The availability of a flow control capability can prevent access starvation for low priority devices and may allow monitoring devices to signal urgent and critical events.

According to various aspects of the disclosure, a slave device that is the target of a device write by a master device can use in-band signaling to cause the master device to suspend or terminate the current transaction, defer or delay initiation of further transactions involving the slave device, and/or refrain from transmitting further data to the slave device.

In one aspect, the mode of transmission of the ninth bit in a transmitted frame may be modified. A data frame transmitted during an I3C SDR write may be configured with a ninth bit that functions as a T-bit that can support in-band signaling. In one example, the slave device may drive SDA during the T-bit slot. The master device may monitor SDA and may determine that the slave device is requesting flow control when the SDA is driven to a certain agreed or defined signaling state. The assertion of flow control may cause the bus master to transmit a STOP condition or repeated START.

In one aspect, the use of the ninth bit as a T-bit during a slave write can be enabled dynamically. For example, the bus master may transmit a bus management command that enables flow control at the slave device. Conventional devices that do not support the flow control disclosed herein can coexist on the same serial bus that accommodates slave devices that can assert flow control.

Figure 9:
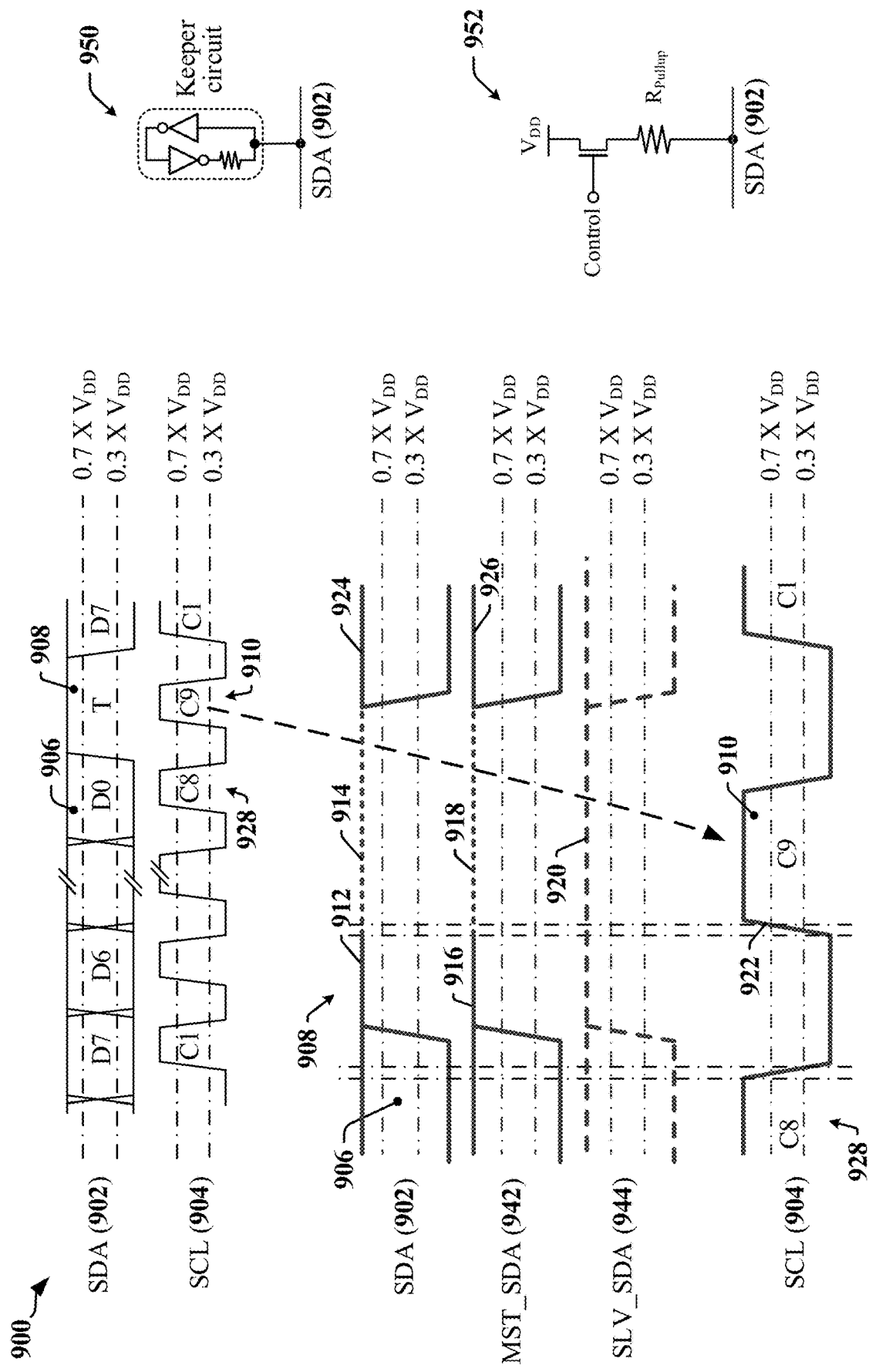
FIG. 9 illustrates the transmission of a T-bit in a slave write transaction to support flow control according to certain aspects of the disclosure.

FIG. 9 illustrates the transmission of a T-bit 908 in a slave write transaction 900 to support flow control according to certain aspects of the disclosure. In this example, flow control is not asserted. During the slave write transaction 900, a master device provides a clock signal on SCL 904 and transmits eight bits of data in a nine-bit frame, each bit of the frame being coincident with a corresponding pulse in the clock signal. For example, the last bit of data (here D0 906) is transmitted while the eighth pulse (C8 928) of the frame is present on SCL 904. The T-bit 908 is transmitted concurrently with the ninth pulse (C9 910) of the frame, and in place of the parity bit that would be transmitted according to conventional I3C protocols.

The output 942 of a line driver in the master device is active in order to transmit the first eight bits of the frame, and the line driver provides the signal 912 on SDA 902. The corresponding output 944 of the line driver of the slave device presents a high-impedance 920 to SDA 902 throughout this example. The signal 912 includes an initial portion of the T-bit 908, in which SDA 902 is driven high until the line driver in the master device coupled to SDA 902 enters a high-impedance state 918. SDA 902 is in a high-impedance state for a duration of time 914 corresponding to the time when both master and slave drivers are in high-impedance states, and in a driven state 916, 926 when either driver is active. The high-impedance state 918 of the line driver in the master device may result when the line driver is configured for open-drain mode, for example. In one example, the master device may switch its SDA line driver from an active drive mode to an open-drain class pull-up mode (or any other high impedance/keeper structure) at or near the time it begins to drive a rising edge 922 of the clock signal transmitted on SCL 904. When the line driver enters the high-impedance state 918, SDA 902 may be pulled high by a pullup structure 950, 952 which may include a keeper circuit, a weak transistor circuit, pullup resistor or the like, and the pull-up structure may be coupled through a switch to SDA 902. FIG. 9 illustrates of a first type of pullup structure 950 that is implemented using a keeper circuit and a second type of pullup structure 952 that is implemented using a transistor-switched pullup resistor. SDA 902 remains high unless pulled low by a device other than the master device. In the illustrated example, the slave device refrains from driving SDA 902 and flow control is not asserted. The current transaction may continue with the output 942 of the line driver in the master device entering in a driven state 926 in order to transmit the next frame as the signal 924 on SDA 902.

Figure 10:
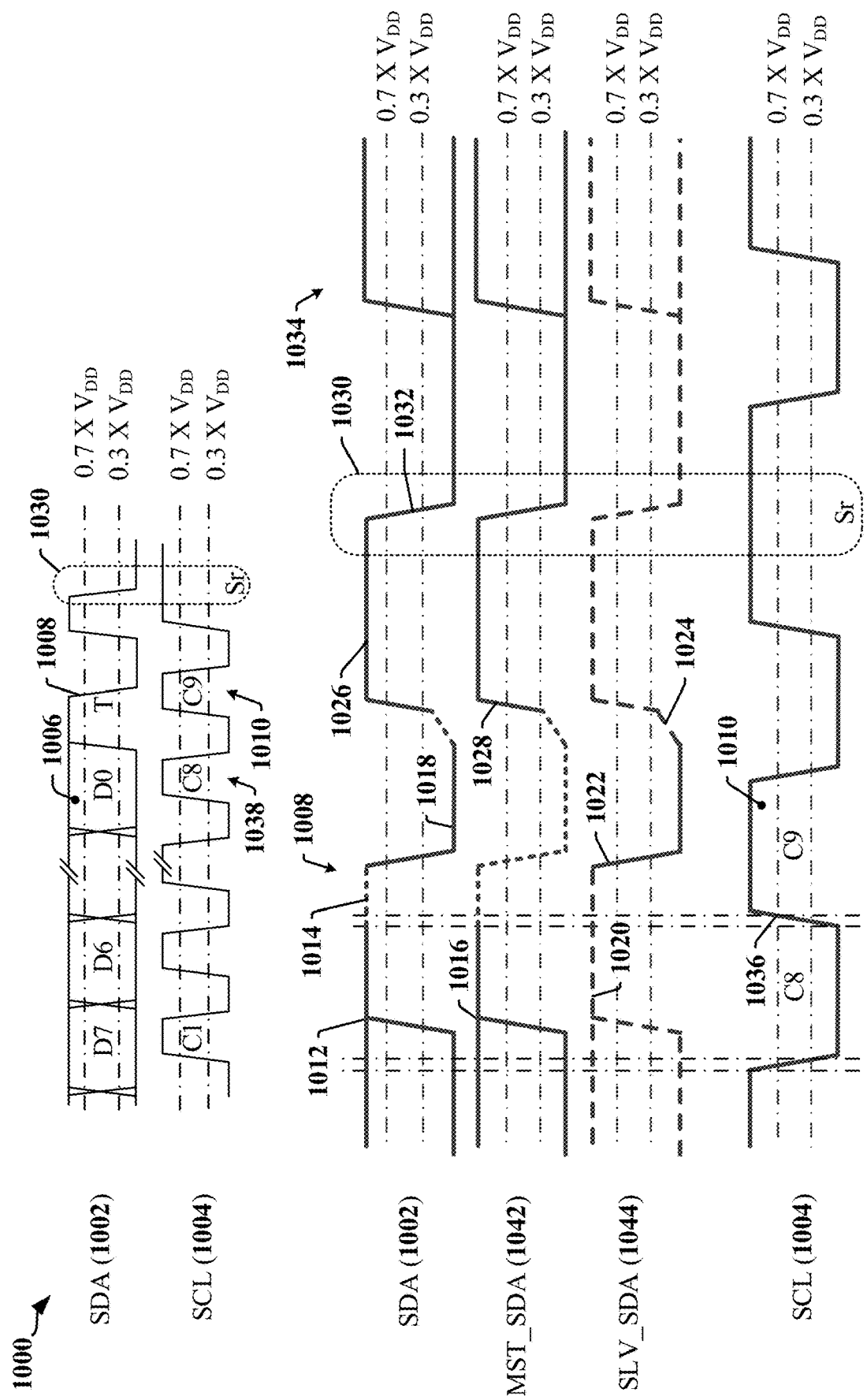
FIG. 10 illustrates a first example in which flow control is asserted during transmission of a T-bit in a slave write transaction in accordance with certain aspects disclosed herein.

FIG. 10 illustrates a first example in which flow control is asserted during transmission of a T-bit 1008 in a slave write transaction 1000 in accordance with certain aspects disclosed herein. During the slave write transaction 1000, a master device provides a clock signal on SCL 1004 and transmits eight bits of data in a nine-bit frame, each bit of the frame being coincident with corresponding pulses in the clock signal. For example, the last bit of data (here D0 1006) is transmitted while the eighth pulse (C8 1038) of the frame is present on SCL 1004. The T-bit 1008 is transmitted concurrently with the ninth pulse (C9 1010) of the frame, and in place of the parity bit that would be transmitted when operating under conventional protocols.

The output 1042 of a line driver in the master device that is coupled to SDA 1002 is in an active drive state 1016 in order to transmit data as the first eight bits of the frame, and the line driver provides the signal 1012 on SDA 1002. The output 1044 of a line driver in the slave device that is coupled to SDA 1002 presents a high-impedance 1020 to SDA 1002 during transmission of the eight data bits. The signal 1012 on SDA 1002 includes an initial portion of the T-bit 1008, after which the output 1042 of the line driver enters a high-impedance state pulled high by a pull-up structure to maintain the high state 1014 on SDA 1002, where the pull-up structure may include a keeper circuit, a weak transistor circuit, pullup resistor or the like. Initially in the active drive state 1016, the line driver in the master device enters a high-impedance state when the line driver is configured for open-drain mode, for example. In one example, the master device may switch its SDA line driver from an active drive mode to an open-drain class pull-up mode (or any other high impedance/keeper structure) at or near the time it begins to drive a rising edge 1036 on SCL 1004. When the output 1042 of the line driver enters high-impedance state, SDA 1002 may be pulled high by a pull-up structure, which may be coupled through a switch to SDA 1002. In this example, SDA 1002 remains high until pulled low 1018 by the slave device to request flow control.

The output 1044 of the line driver in the slave device is activated during the T-bit 1008 when the slave device desires termination or pausing of the write transaction. In one example, the line driver of the slave device is activated after the slave device has detected the rising edge 1036 of the C9 pulse 1010 in the clock signal transmitted on SCL 1004. The output 1044 of the line driver in the slave device provides a signal 1022 that drives SDA 1002 to a low state. After the C9 pulse 1010 has been transmitted, the output 1044 of the line driver in the slave device is returned to a high impedance state 1024. SDA 1002 is pulled toward a high state until the output 1042 of the line driver in the master device becomes active 1028 and drives SDA 1002 to the high state 1026. The master device then provides an edge 1032 on SDA 1002, which transitions low to produce a Repeated START condition 1030. The master device may initiate a new transaction 1034 after the Repeated START condition 1030.

Figure 11:
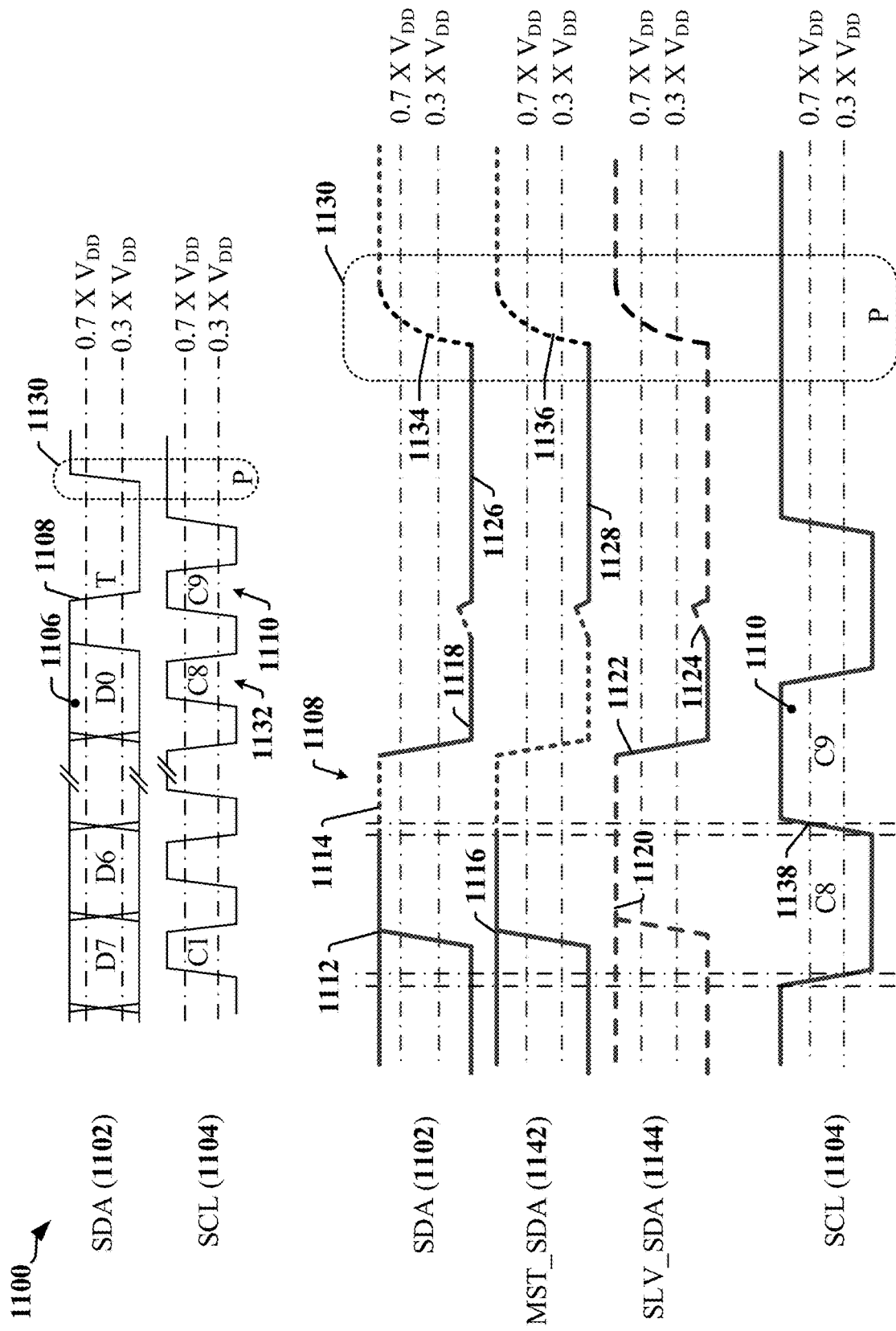
FIG. 11 illustrates a second example in which flow control is asserted during transmission of a T-bit in a slave write transaction in accordance with certain aspects disclosed herein.

FIG. 11 illustrates a second example in which flow control is asserted during transmission of a T-bit 1108 in a slave write transaction 1100 in accordance with certain aspects disclosed herein. During the slave write transaction 1100, a master device provides a clock signal on SCL 1104 and transmits eight bits of data in a nine-bit frame, each bit of the frame being coincident with corresponding pulses in the clock signal. For example, the last bit of data (here D0 1106) is transmitted while the eighth pulse (C8 1132) of the frame is present on SCL 1104. The T-bit 1108 is transmitted concurrently with the ninth pulse (C9 1110) of the frame, and in place of the parity bit that would be transmitted when operating under conventional protocols.

The output 1142 of a line driver in the master device is active in order to transmit data as the first eight bits of the frame, and the line driver provides the signal 1112 on SDA 1102. The output 1144 of the line driver in the slave device presents a high-impedance 1120 to SDA 1102 during transmission of the eight data bits. The signal 1112 includes an initial portion of the T-bit 1108, after which the output 1142 of the line driver in the master device enters a high-impedance state 1114 that is pulled high by a pull-up structure, which may include a keeper circuit, a weak transistor circuit, pullup resistor or the like. Initially in the active drive state 1116, the output 1142 of the line driver in the master device enters a high-impedance state. In one example, the master device may switch its SDA line driver from an active drive mode to an open-drain class pull-up mode (or any other high impedance/keeper structure) at or near the time it begins to drive a rising edge 1138 on SCL 1104. The high-impedance state 1114 on SDA 1102 may result when the output 1142 in the line driver is configured for open-drain mode, in which SDA 1102 is pulled high by a pull-up structure, which may be coupled through a switch to SDA 1102.

In this example, SDA 1102 remains high until pulled low 1118 by the slave device to request flow control. The output 1144 of the line driver in the slave device is activated during the T-bit 1108 when the slave device desires termination or pausing of the write transaction. In one example, the line driver of the slave device is activated after the slave device has detected the rising edge 1138 of the C9 pulse 1110 in the clock signal transmitted on SCL 1104. The output 1144 of the line driver in the slave device provides a signal 1122 that drives SDA 1102 to the low state. After the C9 pulse 1110 has been transmitted, the output 1144 of the line driver in the slave device is returned to a high impedance state 1124. SDA 1102 is pulled toward a high state until the line driver of the master device becomes active low 1128 and drives SDA 1102 to a low state 1126. A STOP condition 1130 may be provided. In one example, the output 1142 of the line driver in the master device may enter the high-impedance state 1136 causing SDA 1102 to transition 1134 high while SCL 1104 is high. The transition 1134 may be caused by the action of a pull-up structure. In another example, the line driver of the master device may drive and remain active until SDA 1102 has transitioned high while SCL 1104 is high.

Figure 12:
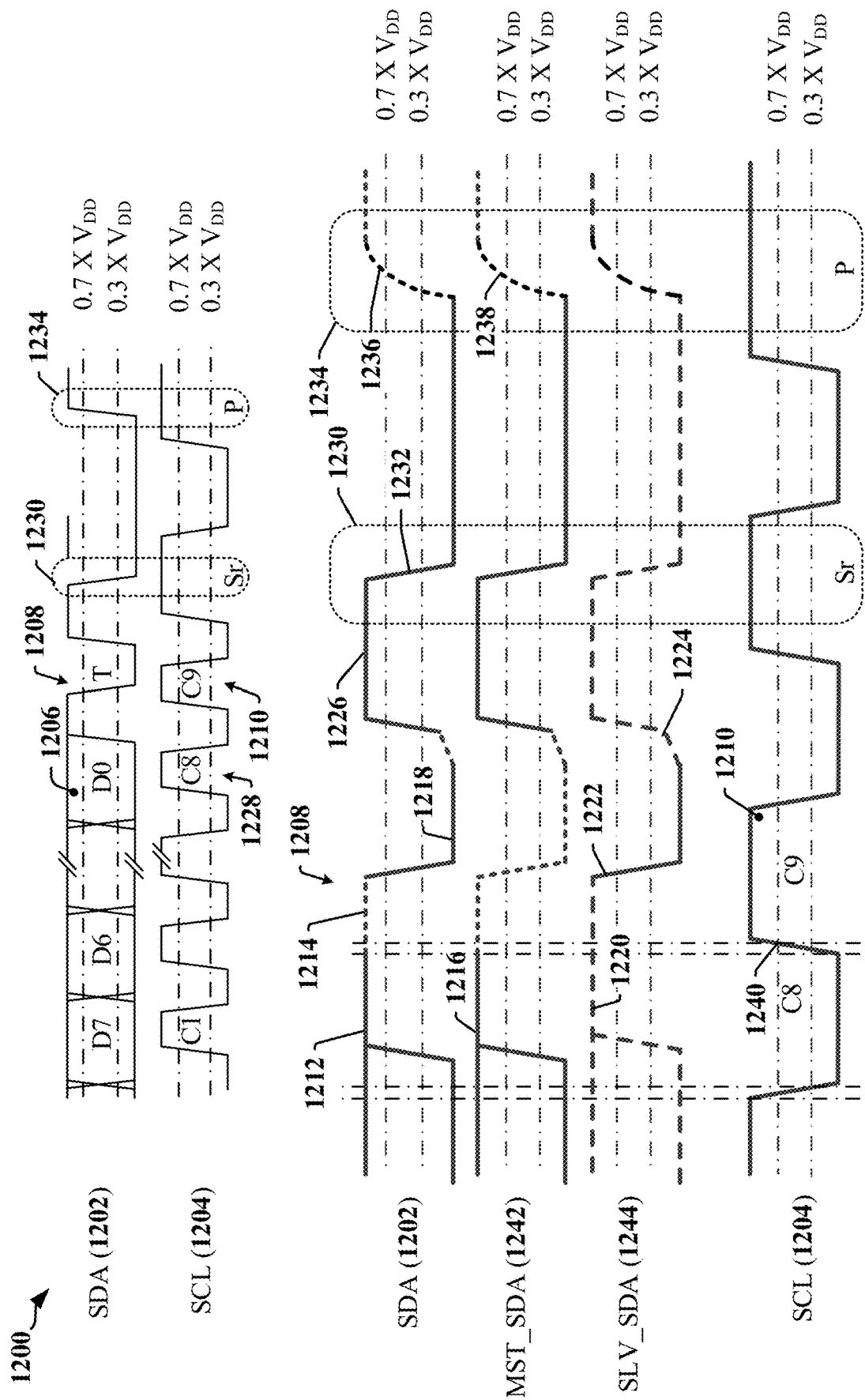
FIG. 12 illustrates a third example in which flow control is asserted during transmission of a T-bit in a slave write transaction in accordance with certain aspects disclosed herein.

FIG. 12 illustrates a third example in which flow control is asserted during transmission of a T-bit 1208 in a slave write transaction 1200 in accordance with certain aspects disclosed herein. During the slave write transaction 1200, a master device provides a clock signal on SCL 1204 and transmits eight bits of data in a nine-bit frame, each bit of the frame being coincident with corresponding pulses in the clock signal. For example, the last bit of data (here D0 1206) is transmitted while the eighth pulse (C8 1228) of the frame is present on SCL 1204. The T-bit 1208 is transmitted concurrently with the ninth pulse (C9 1210) of the frame, and in place of the parity bit that would be transmitted when operating under conventional protocols.

The output 1242 of a line driver in the master device is active in order to transmit data as the first eight bits of the frame, and the line driver provides the signal 1212 on SDA 1202. The output 1244 of the line driver in the slave device presents a high-impedance 1220 to SDA 1202 during transmission of the eight data bits. The signal 1212 includes an initial portion of the T-bit 1208, which is driven high until the output 1242 of the line driver in the master device enters a high-impedance state. Initially in the active drive state 1216, the line driver in the master device enters a high-impedance state when the line driver is configured for open-drain mode, for example. In one example, the master device may switch its SDA line driver from an active drive mode to an open-drain class pull-up mode (or any other high impedance/keeper structure) at or near the time it begins to drive a rising edge 1240 on SCL 1204. The high-impedance state 1214 on SDA 1202 may result when the output 1242 of the line driver in the master device is configured for open-drain mode, for example.

When the output 1242 of the line driver in the master device enters high-impedance state, SDA 1202 may be pulled high by a pull-up structure, which may be coupled through a switch to SDA 1202. In this example, SDA 1202 remains high until pulled low 1218 by the slave device to request flow control. The output 1244 of the line driver in the slave device is activated during the T-bit 1208 when the slave device desires termination or pausing of the write transaction. In one example, the output 1244 of the line driver in the slave device is activated after the slave device has detected the rising edge 1240 of the C9 pulse 1210 in the clock signal transmitted on SCL 1204. The output 1244 of the line driver in the slave device provides a signal 1222 that is transmitted on SDA 1202. After the C9 pulse 1210 has been transmitted, the output 1244 of the line driver in the slave device is returned to a high impedance state 1224. SDA 1202 is pulled toward a high state until the output 1242 of the line driver in the master device becomes active and drives SDA 1202 to the high state 1226. SDA 1202 then transitions 1232 low to produce a Repeated START condition 1230. The master device may provide STOP condition 1234 after the Repeated START condition 1230. In one example, the output 1242 of the line driver in the master device may enter the high-impedance state 1238 causing SDA 1202 to transition 1236 high due to the action of the pull-up structure. In another example, the output 1242 of the line driver in the master device may remain active until SDA 1202 has transitioned high.

Examples of Processing Circuits and Methods

Figure 13:
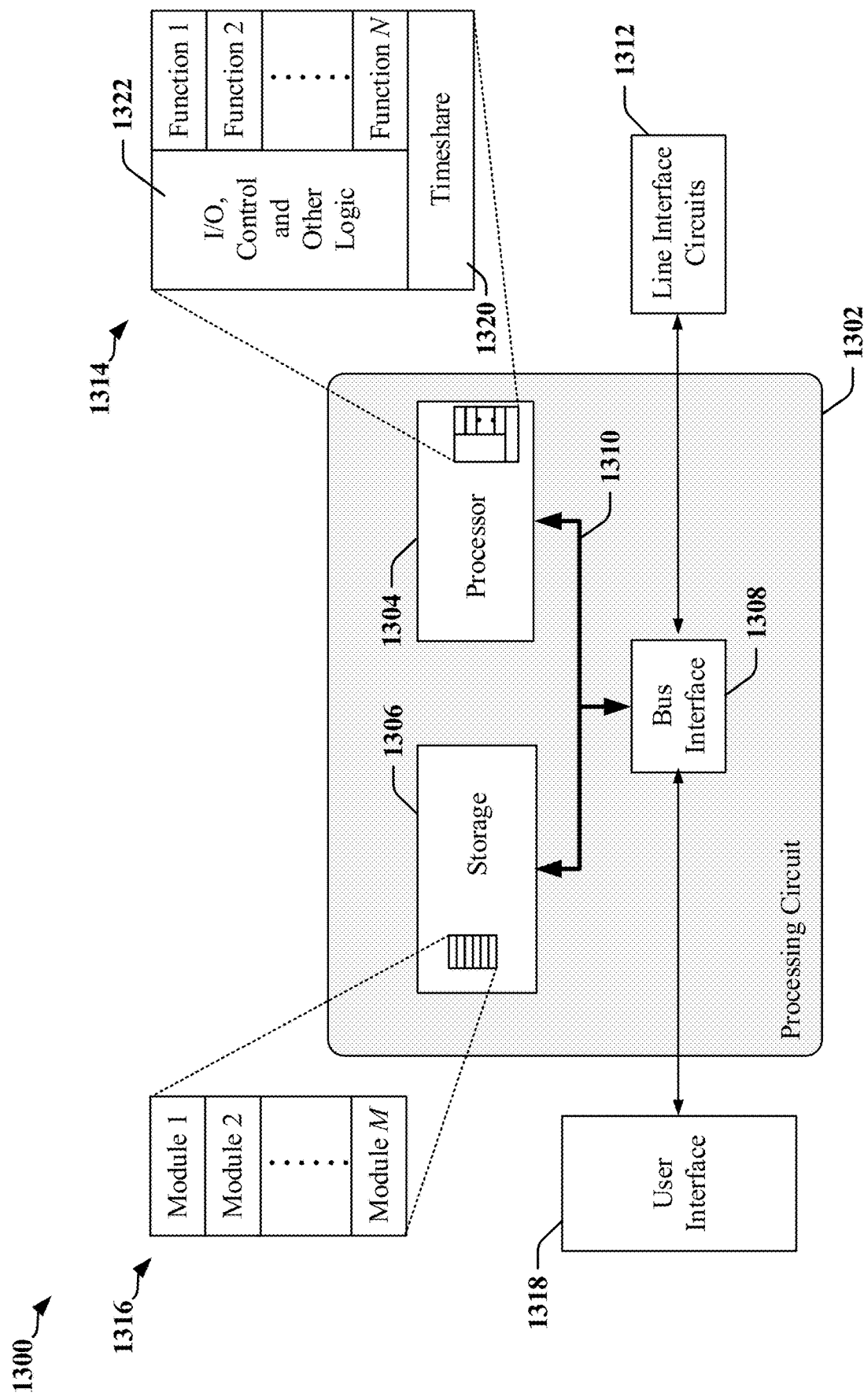
FIG. 13 is a block diagram illustrating an example of an apparatus employing a processing circuit that may be adapted according to certain aspects disclosed herein.

FIG. 13 is a diagram illustrating an example of a hardware implementation for an apparatus 1300 employing a processing circuit 1302 that may be configured to perform one or more functions disclosed herein. In accordance with various aspects of the disclosure, an element, or any portion of an element, or any combination of elements as disclosed herein may be implemented using the processing circuit 1302. The processing circuit 1302 may include one or more processors 1304 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The bus 1310 may also link various other circuits such as timing sources, timers, peripherals, voltage regulators, and power management circuits. A bus interface 1308 may provide an interface between the bus 1310 and one or more transceivers 1312. A transceiver 1312 may be provided for each networking technology supported by the processing circuit. In some instances, multiple networking technologies may share some or all of the circuitry or processing modules found in a transceiver 1312. Each transceiver 1312 provides a means for communicating with various other apparatus over a transmission medium. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain software maintained and/or organized in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as the transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to the transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

Figure 14:
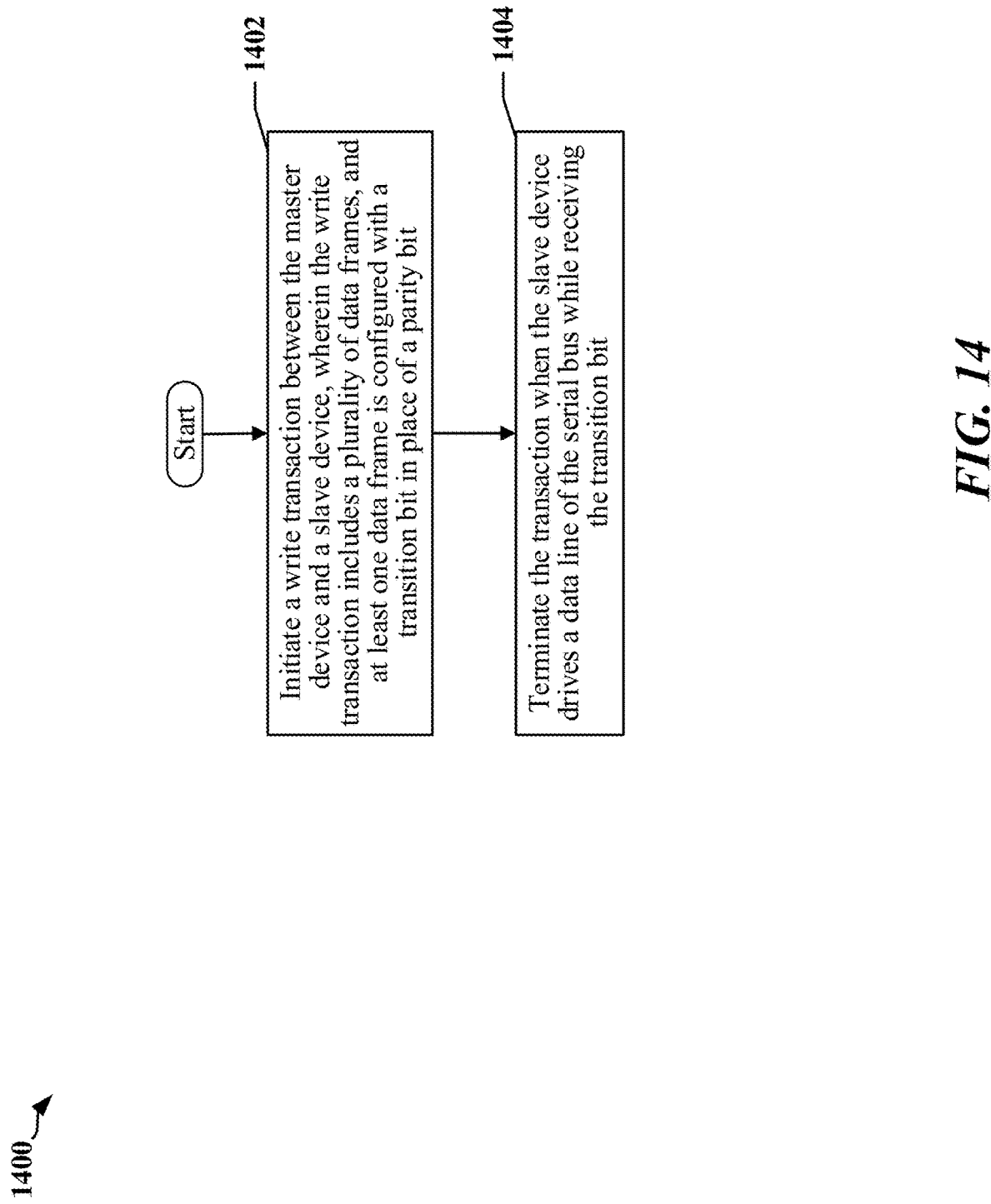
FIG. 14 is a flowchart illustrating certain operations of a slave device coupled to a serial bus and configured in accordance with certain aspects disclosed herein.

FIG. 14 is a flowchart 1400 of a method that may be performed at a master device coupled to a serial bus and configured to communicate in accordance with one or more protocols, including an I3C SDR protocol. At block 1402, the master device may initiate a write transaction between the master device and a slave device. The write transaction may include a plurality of data frames. At least one data frame may be configured with a transition bit in place of a parity bit. At block 1404, the master device may terminate the transaction when the slave device drives a data line of the serial bus while receiving the transition bit. Terminating the transaction may include transmitting signaling corresponding to a repeated START condition defined by a protocol used to control communications over the serial bus. Terminating the transaction may include transmitting signaling corresponding to a STOP condition defined by a protocol used to control communications over the serial bus. In one example, the STOP condition may be transmitted after the repeated START condition.

In various examples, the transition bit is provided in the at least one data frame by driving the data line of the serial bus to a high state after data bits of the at least one data frame have been transmitted. A line driver coupled to the data line may be caused or controlled to enter a high impedance mode after driving the data line of the serial bus to the high state. The data line may be maintained at the high state by a pull-up structure while the line driver is in the high impedance mode. The high impedance mode may include an open-drain mode. In one example, the master device may detect a low state on the data line in a bit interval reserved for the transition bit, and terminate the transaction after detecting the low state on the data line.

Figure 15:
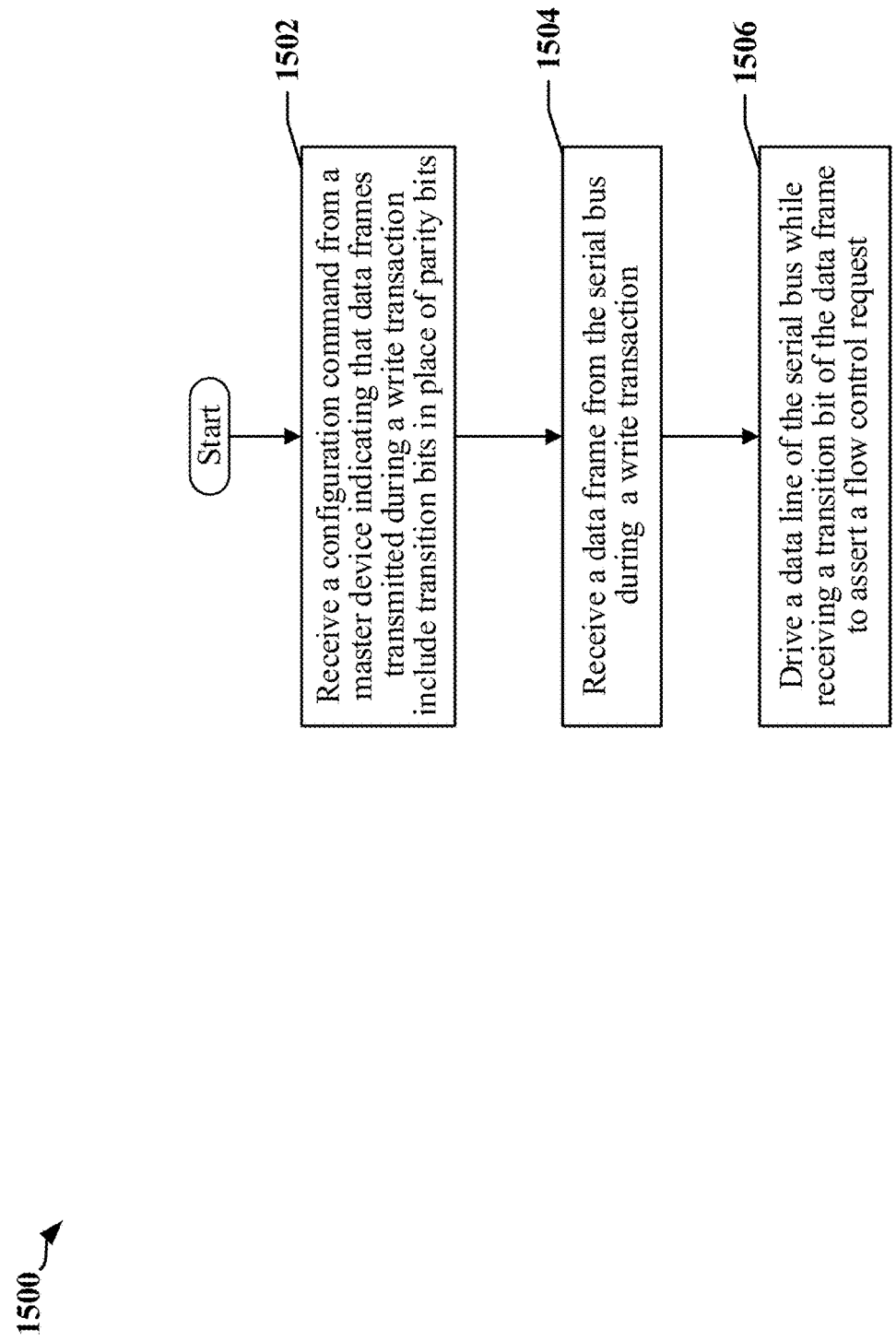
FIG. 15 is a flowchart illustrating certain operations of a slave device coupled to a serial bus and configured in accordance with certain aspects disclosed herein.

FIG. 15 is a flowchart 1500 of a method that may be performed at a slave device coupled to a serial bus and configured to communicate in accordance with one or more protocols, including an I3C SDR protocol. At block 1502, the slave device may receive a configuration command from a master device indicating that data frames transmitted during a write transaction include transition bits in place of parity bits. At block 1504, the slave device may receive a data frame from the serial bus during a write transaction. At block 1506, the slave device may drive a data line of the serial bus while receiving a transition bit of the data frame to assert a flow control request.

In certain examples, the slave device may receive signaling corresponding to a repeated START condition after asserting the flow control request, the repeated START condition being defined by a protocol used to control communications over the serial bus. The slave device may receive signaling corresponding to a STOP condition after receiving the repeated START condition. The slave device may receive signaling corresponding to a STOP condition defined by a protocol used to control communications over the serial bus after asserting the flow control request and without first receiving or detecting a repeated START condition.

In various examples, the transition bit is provided on the data line after eight data bits of the data frame have been received. The data line may be maintained in a high state by a pull-up structure prior to assertion of flow control. The slave device may drive the data line low to assert flow control.

Figure 16:
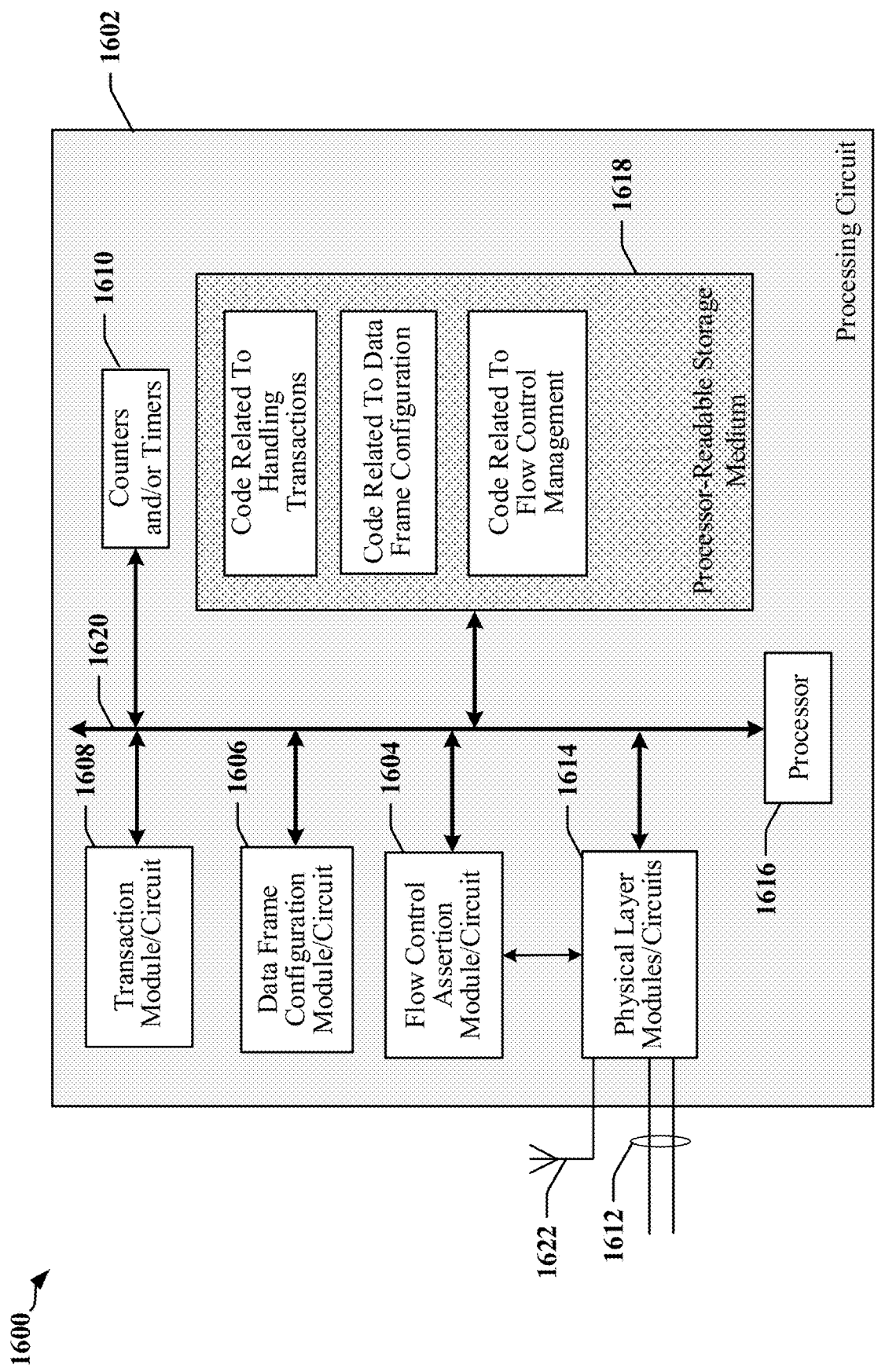
FIG. 16 illustrates an example of a hardware implementation for an apparatus adapted in accordance with certain aspects disclosed herein.

FIG. 16 is a diagram illustrating a simplified example of a hardware implementation for an apparatus 1600 employing a processing circuit 1602. The processing circuit 1602 typically has a controller or processor 1616 that may include one or more microprocessors, microcontrollers, digital signal processors, sequencers and/or state machines. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the controller or processor 1616, the modules or circuits 1604, 1606 and 1608, and the processor-readable storage medium 1618. One or more physical layer circuits and/or modules 1614 may be provided to support communications over a communication link implemented using a multi-wire bus 1612, through an antenna 1622 (to a radio network for example), and so on. The bus 1620 may also link various other circuits such as timing sources 1610, peripherals, voltage regulators, and power management circuits, which are well known in the art, and therefore, will not be described any further.

The processor 1616 is responsible for general processing, including the execution of software, code and/or instructions stored on the processor-readable storage medium 1618. The processor-readable storage medium may include a non-transitory storage medium. The software, when executed by the processor 1616, causes the processing circuit 1602 to perform the various functions described supra for any particular apparatus. The processor-readable storage medium may be used for storing data that is manipulated by the processor 1616 when executing software. The processing circuit 1602 further includes at least one of the modules 1604, 1606 and 1608. The modules 1604, 1606 and 1608 may be software modules running in the processor 1616, resident/stored in the processor-readable storage medium 1618, one or more hardware modules coupled to the processor 1616, or some combination thereof. The modules 1604, 1606 and 1608 may include microcontroller instructions, state machine configuration parameters, or some combination thereof.

In one configuration, the apparatus 1600 includes a module and/or circuit 1604 configured to detect and/or assert flow control during transmission of a T-bit on the multi-wire bus 1612, modules and/or circuits 1608, 1614 configured to manage data transactions over a multi-wire bus 1612, and modules and/or circuits 1606 for configuring data frame formats, including establishing whether a parity bit or T-bit is transmitted in a write slave transaction.

In one example, the apparatus 1600 may be adapted to operate as a master device when coupled to a serial bus. The apparatus 1600 may include a bus interface circuit, and a processor 1616. The bus interface circuit may be operated in accordance with an I3C SDR protocol and be configured to couple the apparatus 1600 to the multi-wire bus 1612. The processor 1616 may be adapted to initiate a write transaction between the master device and a slave device. The write transaction may include a plurality of data frames, and at least one data frame may be configured with a transition bit in place of a parity bit. The processor 1616 may be adapted to terminate the transaction when the slave device drives a data line of the serial bus while receiving the transition bit.

In another example, the apparatus 1600 may be adapted to operate as a slave device when coupled to a serial bus. The apparatus 1600 may include a bus interface circuit, and a processor 1616. The bus interface circuit may be operated in accordance with an I3C SDR protocol and be configured to couple the apparatus 1600 to the multi-wire bus 1612. The processor 1616 may be adapted to receive a configuration command from a master device indicating that data frames transmitted during a write transaction include transition bits in place of parity bits, receive a data frame from the serial bus during the write transaction, and cause the bus interface to assert a flow control request by driving a data line of the serial bus while a transition bit of the data frame is being received.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a master device coupled to a serial bus, comprising:
   initiating a write transaction between the master device and a slave device, wherein the write transaction includes a plurality of data frames to be transmitted over a data line of the serial bus;
   transmitting a transition bit from the master device in place of a parity bit of a first data frame while transmitting the first data frame to the slave device; and
   terminating the write transaction when the slave device is determined to be driving the data line of the serial bus while the transition bit is being transmitted from the master device over the data line of the serial bus.

2. The method of claim 1, wherein terminating the write transaction comprises:
   transmitting signaling corresponding to a repeated START condition defined by a protocol used to control communications over the serial bus.

3. The method of claim 2, wherein terminating the write transaction further comprises:
   transmitting signaling corresponding to a STOP condition defined by the protocol used to control communications over the serial bus after transmitting the repeated START condition.

4. The method of claim 1, wherein terminating the write transaction comprises:
   transmitting signaling corresponding to a STOP condition defined by a protocol used to control communications over the serial bus.

5. The method of claim 1, further comprising:
   providing the transition bit in the first data frame by driving the data line of the serial bus to a high state after data bits of the first data frame have been transmitted; and
   causing a line driver coupled to the data line to enter a high impedance mode after driving the data line of the serial bus to the high state.

6. The method of claim 5, wherein the data line is maintained at the high state by a pull-up structure.

7. The method of claim 5, wherein the high impedance mode comprises an open-drain mode.

8. The method of claim 5, further comprising:
   detecting a low state on the data line in a bit interval reserved for the transition bit; and
   terminating the write transaction after detecting the low state on the data line.

9. The method of claim 1, wherein the serial bus is operated in accordance with an I3C single data rate protocol.

10. An apparatus adapted to operate as a master device when coupled to a serial bus, the apparatus comprising:
    a bus interface circuit configured to couple the apparatus to the serial bus; and
    a processing device configured to:
      initiate a write transaction between the apparatus and a slave device, wherein the write transaction includes a plurality of data frames to be transmitted over a data line of the serial bus;
      transmit a transition bit from the apparatus in place of a parity bit of a first data frame while transmitting the first data frame to the slave device; and
      terminate the write transaction when the slave device is determined to be driving the data line of the serial bus while the transition bit is being transmitted from the apparatus over the data line of the serial bus.

11. The apparatus of claim 10, wherein the processing device is further configured to:
    transmit signaling corresponding to a repeated START condition defined by a protocol used to control communications over the serial bus.

12. The apparatus of claim 11, wherein the processing device is further configured to:
    transmit signaling corresponding to a STOP condition defined by the protocol used to control communications over the serial bus after transmitting the repeated START condition.

13. The apparatus of claim 10, wherein the processing device is further configured to:

transmit signaling corresponding to a STOP condition defined by a protocol used to control communications over the serial bus.

14. The apparatus of claim 10, wherein the processing device is further configured to:
provide the transition bit in the first data frame by driving the data line of the serial bus to a high state after data bits of the first data frame have been transmitted; and
cause a line driver coupled to the data line to enter a high impedance mode after driving the data line of the serial bus to the high state.

15. The apparatus of claim 14, wherein the processing device is further configured to:
detect a low state on the data line in a bit interval reserved for the transition bit; and
terminate the write transaction after detecting the low state on the data line.

16. A method performed at a slave device coupled to a serial bus, comprising:
receiving a configuration command from a master device indicating that data frames transmitted during a write transaction include transition bits in place of parity bits;
receiving a first data frame from a data line of the serial bus during the write transaction; and
driving the data line to assert a flow control request while receiving a first transition bit of the first data frame from the data line.

17. The method of claim 16, further comprising:
receiving signaling corresponding to a repeated START condition after asserting the flow control request, the repeated START condition being defined by a protocol used to control communications over the serial bus.

18. The method of claim 17, further comprising:
receiving signaling corresponding to a STOP condition after receiving the repeated START condition.

19. The method of claim 16, further comprising:
receiving signaling corresponding to a STOP condition defined by a protocol used to control communications over the serial bus after asserting the flow control request.

20. The method of claim 16, wherein the first transition bit of the first data frame is provided on the data line after eight data bits of the first data frame have been received.

21. The method of claim 16, wherein the data line is maintained in a high state by a pull-up structure prior to assertion of the flow control request, further comprising:
driving the data line to a low state to assert the flow control request.

22. The method of claim 16, wherein the serial bus is operated in accordance with an I3C single data rate protocol.

23. An apparatus adapted to operate as a slave device when coupled to a serial bus, the apparatus comprising:
a bus interface circuit configured to couple the apparatus to the serial bus; and
a processing device configured to:
receive a configuration command from a master device indicating that data frames transmitted during a write transaction include transition bits in place of parity bits;
receive a first data frame from a data line of the serial bus during the write transaction; and
cause the bus interface circuit to assert a flow control request by driving the data line while a first transition bit of the first data frame is being received from the data line.

24. The apparatus of claim 23, wherein the processing device is further configured to:
receive signaling corresponding to a repeated START condition after asserting the flow control request, the repeated START condition being defined by a protocol used to control communications over the serial bus.

25. The apparatus of claim 24, wherein the processing device is further configured to:
receive signaling corresponding to a STOP condition after receiving the repeated START condition.

26. The apparatus of claim 23, wherein the processing device is further configured to:
receive signaling corresponding to a STOP condition defined by a protocol used to control communications over the serial bus after asserting the flow control request.

27. The apparatus of claim 23, wherein the first transition bit of the first data frame is provided on the data line after eight data bits of the first data frame have been received.

28. The apparatus of claim 23, wherein the data line is maintained in a high state by a pull-up structure prior to assertion of the flow control request, wherein the processing device is further configured to:
cause the bus interface circuit to drive the data line to a low state to assert the flow control request.

29. The apparatus of claim 23, wherein the serial bus is operated in accordance with an I3C single data rate protocol.

* * * * *